May 31, 1949.  R. GROETCHEN  2,471,566
COOKING OVEN WITH MEANS TO WITHDRAW
UTENSILS THEREFROM
Filed Feb. 23, 1945
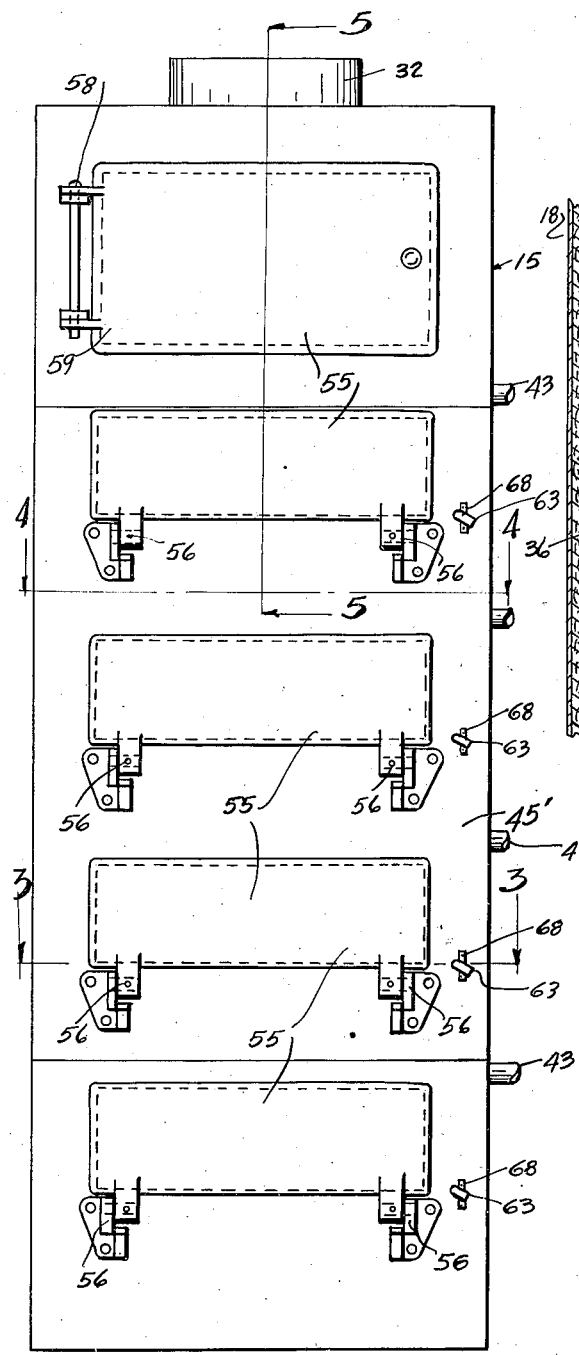
Fig. 1
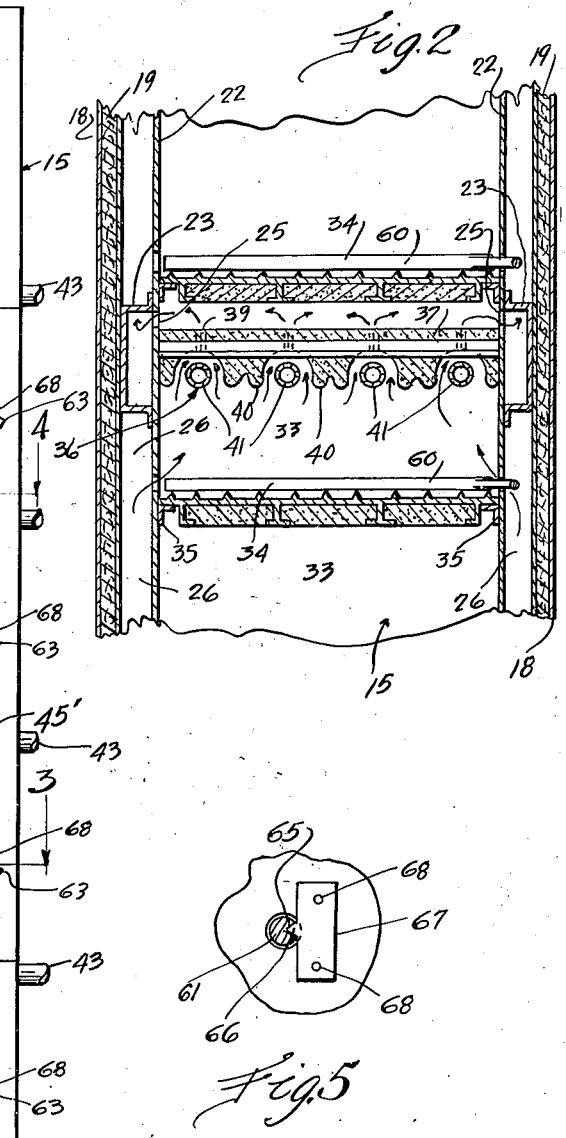
Fig. 2
Fig. 5
INVENTOR.
Richard Groetchen
BY
His Attorney May 31, 1949.  R. GROETCHEN  2,471,566
COOKING OVEN WITH MEANS TO WITHDRAW
UTENSILS THEREFROM Filed Feb. 23, 1945  2 Sheets-Sheet 2

INVENTOR.
Richard Groetchen
BY
His Attorney

Patented May 31, 1949

2,471,566

UNITED STATES PATENT OFFICE 2,471,566

COOKING OVEN WITH MEANS TO WITHDRAW UTENSILS THEREFROM

Richard Groetchen, Chicago, Ill.

Application February 23, 1945, Serial No. 579,329

2 Claims. (Cl. 126—337)

1

This invention relates to certain new and useful improvements in cooking ovens with means to withdraw utensils therefrom and has for its principal object the provision of an improved construction of this character which will be highly efficient in use and economical in manufacture.

An object of the invention is to provide a cooker which is compact, thereby facilitating the placing of the cooker in a confined space or in a location where it will occupy the minimum amount of space.

A still further object of the invention is the provision of a simple and easily operated mechanism for removing the pans and other trays from within the cooker compartments.

Other objects and advantages of the invention will appear hereinafter.

The invention consists in the novel combination and arrangement of parts to be hereinafter described and claimed.

The invention will be best understood by reference to the accompanying drawings showing the preferred form of construction, and in which:

Fig. 1 is a front elevational view of the cooker embodied in the invention;

Fig. 2 is a fragmentary sectional detail view taken substantially on line 2—2 of Fig. 3;

Fig. 5 is an elevational view of a follower rod guide embodied in the invention.

Figure 3:
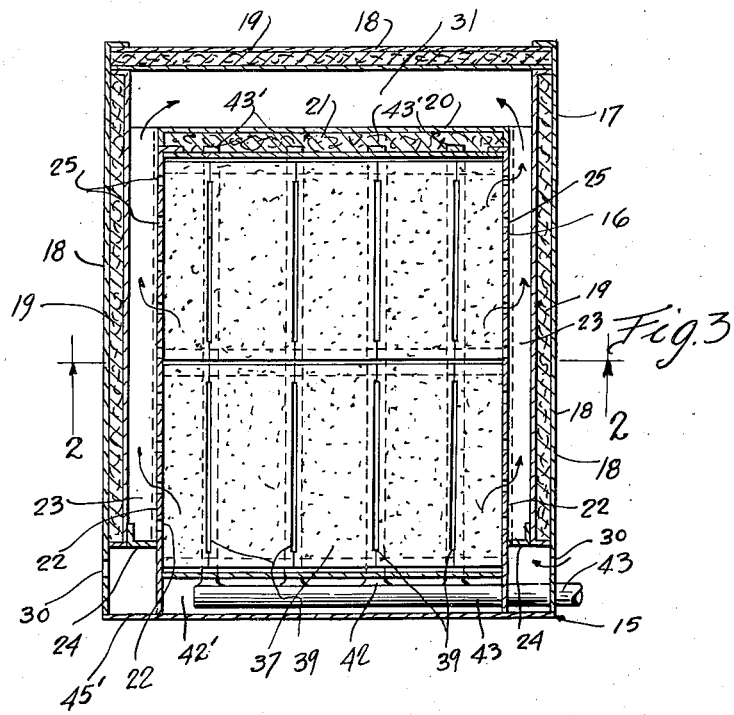
Fig. 3 is a sectional detail view taken substantially on line 3—3 of Fig. 1.
Figure 4:
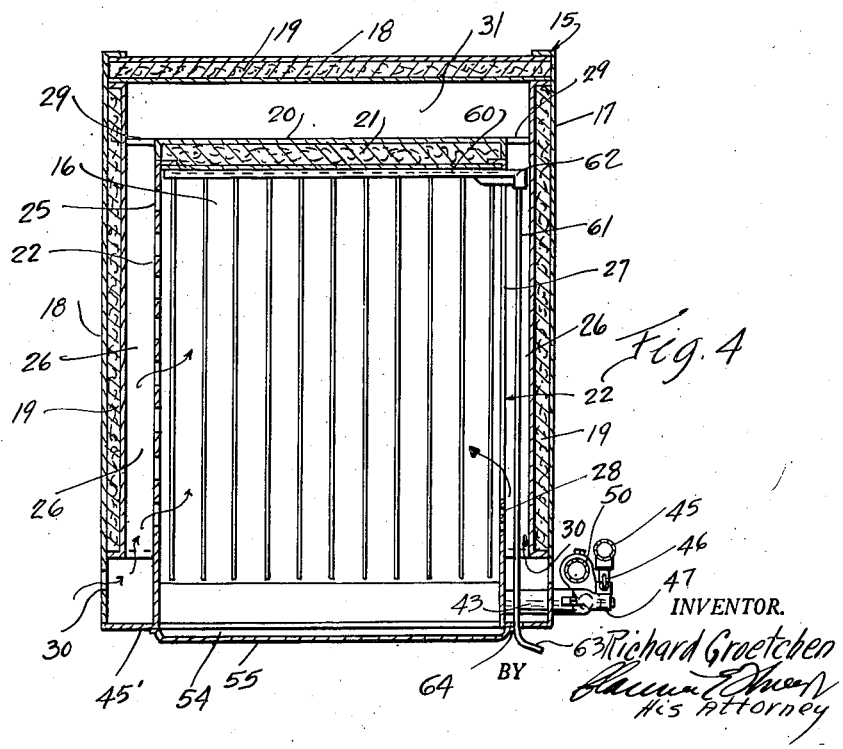
Fig. 4 is a sectional detail view taken substantially on line 4—4 of Fig. 1.

The drawings illustrate the preferred form of construction embodying my invention. By this construction the several objects of the invention are accomplished.

In this connection the cooker is indicated at 15 and includes an inner enclosure 16 and an outer enclosure 17. The side and back walls 18 of the outer enclosure each provide a space in which a suitable insulation 19 is packed.

The back wall 20 of the inner enclosure likewise provides a space in which an insulation 21 is packed.

The side walls 22 of the inner enclosure are spaced substantially from the side walls 18 of the outer enclosure, and mounted in the space thus provided between these side walls are horizontally arranged channels 23 closed at the corresponding end portions 24. In one of the side walls 22 of the inner enclosure 16 there are provided apertures or openings 25 which open communication between the channels 23 and the interior of the inner enclosure 16.

2

Between the channels 23 are passages 26. In the other of the side walls 22 of the inner enclosure are provided elongated slots 27 and spaced openings 28 opening communication between the inner enclosure and these passages 26. Corresponding end portions of these passages are closed as at 29. The side walls 18 of the outer enclosure 17 are provided with spaced openings 30 which communicate with the passages 26. These channels and passages provide a circuitous passage for the circulation of air into and from the inner enclosure.

The back wall of the inner enclosure is likewise spaced from the back wall of the outer enclosure, and this provides a vertical passage 31 having communication with each of the channels 23. Communicating with this passage 31 is a vent 32. It will thus be seen that air is admitted through the openings 30 where it moves into the passages 26 and thence through the openings 27 and 28 into the inner enclosure 16; from thence it passes through the apertures or openings 25 into the channels 23 and then into the vertical passage 31 and out the vent 32. In this movement it is seen that the air takes a circuitous course from the time it enters the openings 30 to that of leaving the vent 32. By this arrangement the cooker is effectively ventilated and a means is provided for maintaining the walls of the outer enclosure at a harmless temperature.

The inner enclosure is divided into a plurality of compartments 33. These compartments 33 are separated by grid plates 34 mounted upon supporting angles 35 secured to the walls of the inner enclosure as shown in Figs. 2 and 5. Each of the grid plates have a wall 35' of ceramic material.

Below these grid plates are mounted burner structures 36 comprising ceramic plates 37 mounted upon supporting angles 38 carried by the walls of the inner enclosure. These ceramic plates 37 are spaced as at 39 to provide an air passage as indicated by the arrows in Fig. 2. Each ceramic plate has a depending portion 40 disposed between the burner pipes 41 which are perforated to direct the flame therefrom against these ceramic depending portions. These burner pipes are connected as at 42 to a branch supply pipe 43 in turn connected to a main supply pipe 45.

Corresponding inner ending portions 43' of these branch pipes are supported by the wall 20 of the inner enclosure (Fig. 3). Each branch pipe is controlled by a suitable valve structure 46.

Access to each of the compartments 33 is provided by suitable door openings 54 normally closed by doors 55. With the exception of the upper one of these doors 55, the remaining doors are of the drop type, that is, hinged as at 56 from the bottom edge thereof to the front wall 45' of the outer enclosure 17. The upper one of these doors 55 is hinged as at 58 from the side edge 59 thereof.

Slidably supported on each of the grid plates 34 is a follower 60 which extends completely across the grid plate and is adapted to engage the pans or trays thereon and, when moved forward, to move such pans or trays from the rear of the compartment to the forward end thereof for removal therefrom.

This forward movement of the follower is accomplished by means of rod 61 having connection to follower 60, by means of suitable bearing 62 which projects through and operates in the elongated opening 27. The exterior end 63 of this rod 61 projects through an opening 64 formed in the front wall 45' of the outer enclosure. This rod 61 has an elongated V-shaped groove 65 formed therein, and engaging in this groove is a V-shaped prong or tooth 66 carried by the plate 67 mounted as at 68 to the front wall of the outer enclosure.

The arrangement is such that this prong or tooth 66, operating in the V-shaped groove 65, will maintain the rod and consequently the follower from turning about an axis during movement of the rod and follower. By pulling rod 61 outwardly, the follower 60 will be brought into engagement with such pans or trays as are mounted upon the grid plate to move the pans or trays to the forward end of the compartment for convenient removal.

A cooker constructed in accordance with the foregoing description results in one having the maximum capacity. The construction permits the cooker to be placed in a confined or limited space, such for example in the kitchen of a dining car where there is a limited amount of space provided for cooking facilities. It is also apparent that a cooker constructed in accordance with the foregoing description will be amply insulated so that the heat may be retained therein and yet the cooker has ample and sufficient ventilation to carry off the fumes therefrom.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. An apparatus of the class described including an enclosure, means dividing the enclosure into a plurality of compartments comprising spaced grid plates and burner structures spaced from the plates, a follower slidably supported upon each of said plates for removing pans or the like from the plates, and means for moving the follower over the plate comprising a handle element extending exteriorly of the enclosure through an opening formed in a wall thereof and having a longitudinally extending guiding groove formed therein, and a member carried by said wall and provided with a prong extending into said groove.

2. An apparatus of the class described including an enclosure having means adapted to permit circulation of air therethrough, means dividing the enclosure into a plurality of compartments comprising spaced grid plates and burner structures spaced from the plates, a follower slidably supported upon each of said plates for removing pans or the like from the plates, means for moving the follower over the plate comprising a handle element extending exteriorly of the enclosure through an opening formed in a wall thereof and having a longitudinally extending guiding groove formed therein, and a member carried by said wall and provided with a prong extending into said groove.

RICHARD GROETCHEN.

REFERENCES CITED

The following references are of record in the file of this patent:

UNITED STATES PATENTS

| Number | Name | Date |
| --- | --- | --- |
| 970,286 | Willson | Sept. 13, 1910 |
| 1,403,814 | O'Dowd | Jan. 17, 1922 |
| 1,565,784 | Brooks | Dec. 15, 1925 |
| 2,015,358 | Brokvist | Sept. 24, 1935 |
| 2,140,973 | Smith | Dec. 20, 1938 |
| 2,205,435 | Raber | June 25, 1940 |

FOREIGN PATENTS

| Number | Country | Date |
| --- | --- | --- |
| 7,185 | Great Britain | 1892 |
| 663,870 | France | Apr. 15, 1929 |